US009085316B2

(12) United States Patent
Yang et al.

(10) Patent No.: US 9,085,316 B2
(45) Date of Patent: Jul. 21, 2015

(54) AVERAGE FRICTION LEARNING AND AVERAGE FRICTION CHANGE ESTIMATION

(71) Applicants: Tao Yang, Midland, MI (US); Michael Eickholt, Chesaning, MI (US); Steve Klein, Munger, MI (US); Tim Kaufmann, Frankenmuth, MI (US); Niharika P. Popy, Saginaw, MI (US)

(72) Inventors: Tao Yang, Midland, MI (US); Michael Eickholt, Chesaning, MI (US); Steve Klein, Munger, MI (US); Tim Kaufmann, Frankenmuth, MI (US); Niharika P. Popy, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 189 days.

(21) Appl. No.: 13/743,386

(22) Filed: Jan. 17, 2013

(65) Prior Publication Data
US 2013/0325263 A1    Dec. 5, 2013

Related U.S. Application Data

(60) Provisional application No. 61/654,136, filed on Jun. 1, 2012.

(51) Int. Cl.
*B62D 5/04* (2006.01)
(52) U.S. Cl.
CPC ............ *B62D 5/0457* (2013.01); *B62D 5/0481* (2013.01)
(58) Field of Classification Search
CPC ............................. B62D 5/0457; B62D 5/0481
See application file for complete search history.

(56) References Cited

U.S. PATENT DOCUMENTS

| 7,239,104 B2 * | 7/2007 | Heilig et al. ................... 318/561 |
| 2010/0256870 A1 * | 10/2010 | Klein ............................... 701/41 |
| 2012/0191301 A1 * | 7/2012 | Benyo et al. .................... 701/41 |

OTHER PUBLICATIONS

Shetty, Kiran Kumar, "A novel algorithm for uplink interference suppression using smart antennas in mobile communications," Masters thesis, Department of Electrical and Computer Engineering, Florida State University. pp. 54-65. Feb. 2004.
Asada, Harry, 2.160 Identification, Estimation, and Learning, Spring 2006. [Lecture Notes 2 and 3] (Massachusetts Institute of Technology: MIT OpenCourseWare), http://ocw.mit.edu (Accessed Jan. 15, 2013), 13 pages.
J. Principe, et al., "Neural and Adaptive Systems: Fundamentals through Simulations," Wiley 2000, 4 pages.

\* cited by examiner

*Primary Examiner* — John Q Nguyen
*Assistant Examiner* — Alan D Hutchinson
(74) *Attorney, Agent, or Firm* — Cantor Colburn LLP

(57) ABSTRACT

A learning function is configured to determine a plurality of piecewise linear function coefficients based on measured data for an electric power-assisted steering (EPS) system. The measured data include a vehicle speed. The learning function is further configured to model a hysteresis loop of the EPS system using a piecewise linear function based on the plurality of piecewise linear function coefficients to determine an average friction. An average friction change compensator is configured to adjust friction-based EPS system compensation based on the average friction for a plurality of vehicle speed intervals of the vehicle speed.

19 Claims, 9 Drawing Sheets

AVERAGE FRICTION LEARNING AND AVERAGE FRICTION CHANGE ESTIMATION

CROSS-REFERENCE TO RELATED APPLICATIONS

This patent application claims priority to U.S. Provisional Patent Application Ser. No. 61/654,136, filed Jun. 1, 2012 which is incorporated herein by reference in its entirety.

BACKGROUND OF THE INVENTION

The present invention relates to methods and systems for controlling a steering system, and more particularly to average friction learning and average friction change estimation in an electric power steering system.

In Electric Power-assisted Steering (EPS) systems, system friction is an important characteristic which can significantly affect the EPS performance and steering feel. During system calibration, the system friction is carefully addressed in order to achieve premium steering feel. However, the system friction is not constant over the EPS system lifespan, and there are many factors affecting the system friction. Some of these factors have a long term impact on the system friction, such as gear wear and grease degradation. Some other factors can affect the system friction level in a relatively rapid way, such as temperature.

A hysteresis loop is commonly used in describing the characteristics of a steering system. In an electric power-assisted steering system, many EPS tuning and compensation values are related to a hysteresis loop. Depending on the variables in the hysteresis loop, some EPS system characteristics can be derived directly from the hysteresis loop. For example, from a hysteresis loop formed by a total steering torque in a column coordinate versus a hand wheel angle, total EPS friction can be approximated as half of the hysteresis height at a given hand wheel angle.

EPS hysteresis loops are traditionally obtained offline during calibration, and all EPS calibration values related to the hysteresis loops are then derived and programmed in persistent memory, such as erasable programmable read only memory (EPROM) or flash memory. However, the EPS system characteristics will change due to environmental changes. At different life stages of an EPS system, a set of calibration parameters which was optimized for the original EPS system will not necessarily continue to give optimal performance.

Efforts have been made to compensate for the system friction, such as hysteresis compensation and temperature compensation functions. For hysteresis compensation, a vehicle speed-dependent curve is used to generate a certain amount of compensation torque to obtain desired steering feel, and this speed-dependent curve is calibrated during system calibration for a given vehicle model for the system friction level at that time. During the life of the EPS system, as the friction changes, the then-to-be-the-best speed dependent hysteresis compensation curve becomes sub-optimal, and an adjustment of the hysteresis compensation curve is desired.

SUMMARY OF THE INVENTION

A system and methods are provided for real-time compensation for average friction changes. In one embodiment, a learning function is configured to determine a plurality of piecewise linear function coefficients based on measured data for an electric power-assisted steering (EPS) system. The measured data include a vehicle speed. The learning function is further configured to model a hysteresis loop of the EPS system using a piecewise linear function based on the plurality of piecewise linear function coefficients to determine an average friction. An average friction change compensator is configured to adjust friction-based EPS system compensation based on the average friction for a plurality of vehicle speed intervals of the vehicle speed.

In another embodiment, a method determines a plurality of piecewise linear function coefficients based on measured data for an EPS system. The measured data include a vehicle speed. A hysteresis loop of the EPS system is modeled using two piecewise linear functions based on the plurality of piecewise linear function coefficients to determine an average friction. Friction-based EPS system compensation is adjusted based on the average friction for a plurality of vehicle speed intervals of the vehicle speed.

In a further embodiment, a method includes initializing a friction compensation system based on determining that the friction compensation system is in a resetting mode. A baseline friction for an EPS system is learned based on determining that the friction compensation system is in a calibration mode. Friction compensation is dynamically adjusted to account for changes from the learned baseline friction based on determining that the friction compensation system is in a running mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting the same, the Figures collectively depict systems and processes for real-time compensation for average friction changes. In exemplary embodiments, real-time compensation for average friction changes is provided. A learning-based hysteresis modeling approach with piecewise linear functions can be used for an average friction change identification and compensation process. Embodiments can be implemented in a system including a microprocessor and memory devices, where the various functions described herein may be distributed between various hardware and/or software components. The microprocessor and memory devices can be incorporated within an embedded control system, such as an electronic power steering module, which can further include communication interfaces, and analog and digital I/O interfaces for acquiring sensor signals and driving one or more actuators.

In exemplary embodiments, in order to provide compensation due to changes in the physical system characteristics, such changes are identified online and in a real-time manner. A generic piecewise linear function model is described herein to approximate any curve, and a learning algorithm is described by which the piecewise linear function coefficients can be obtained iteratively based on measured data. This modeling approach with piecewise linear functions and learning is then applied to model the hysteresis loop between the total column torque versus hand wheel angle to identify the EPS overall system friction level.

Figure 1:
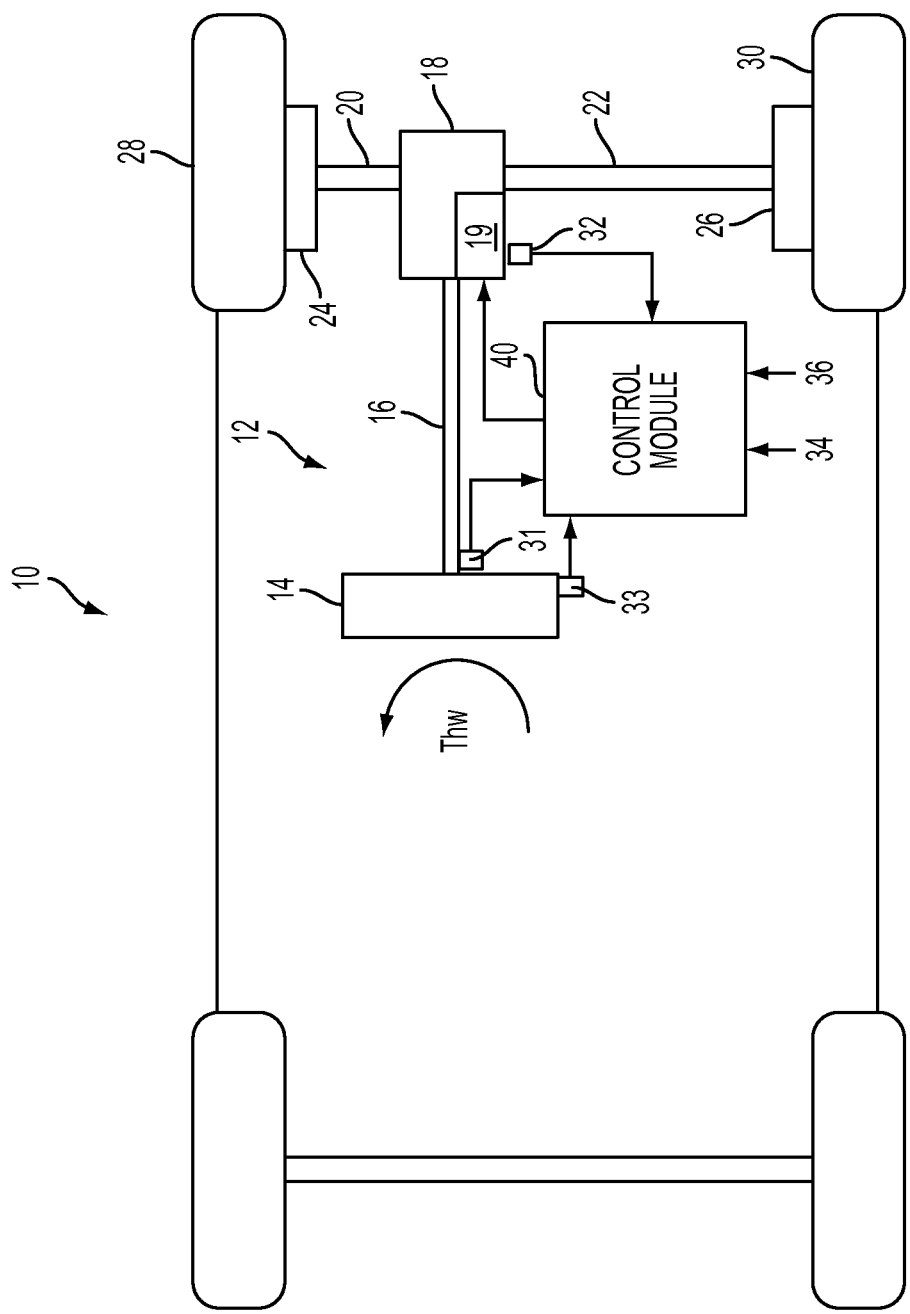
FIG. 1 is a functional block diagram illustrating a vehicle including a steering control system in accordance with an exemplary embodiment of the invention.

Referring now to FIG. 1, where the invention will be described with reference to specific embodiments without limiting the same, an exemplary embodiment of a vehicle 10 including a steering system 12 is illustrated. In various embodiments, the steering system 12 includes a hand wheel 14 coupled to a steering shaft system 16 which includes steering column, intermediate shaft, & the necessary joints. In one exemplary embodiment, the steering system 12 is an electric power steering (EPS) system that further includes a steering assist unit 18 that couples to the steering shaft system 16 of the steering system 12 and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as the hand wheel 14 is turned by a vehicle operator, the steering actuator motor 19 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31-33 generate sensor signals based on the observable conditions. In one example, the sensor 31 is a torque sensor that senses an input driver hand wheel torque ($T_{hw}$) applied to the hand wheel 14 by the operator of the vehicle 10. The torque sensor generates a hand wheel or column torque signal based thereon. In another example, the sensor 32 is a motor torque sensor that senses a torque of the steering actuator motor 19. In yet another example, the sensor 33 is a hand wheel position sensor that senses a position of the hand wheel 14. The sensor 33 generates a hand wheel angle signal based thereon. By monitoring the hand wheel angle signal over a period of time, a hand wheel velocity signal can also be determined.

A control module 40 receives the one or more sensor signals input from sensors 31, 32, 33, and may receive other inputs, such as a vehicle speed signal 34 and a lateral acceleration signal 36. The control module 40 generates a compensated command signal to control the steering actuator motor 19 of the steering system 12 based on one or more of the inputs and further based on the steering control systems and methods of the present disclosure with friction-based EPS system compensation.

Figure 2:
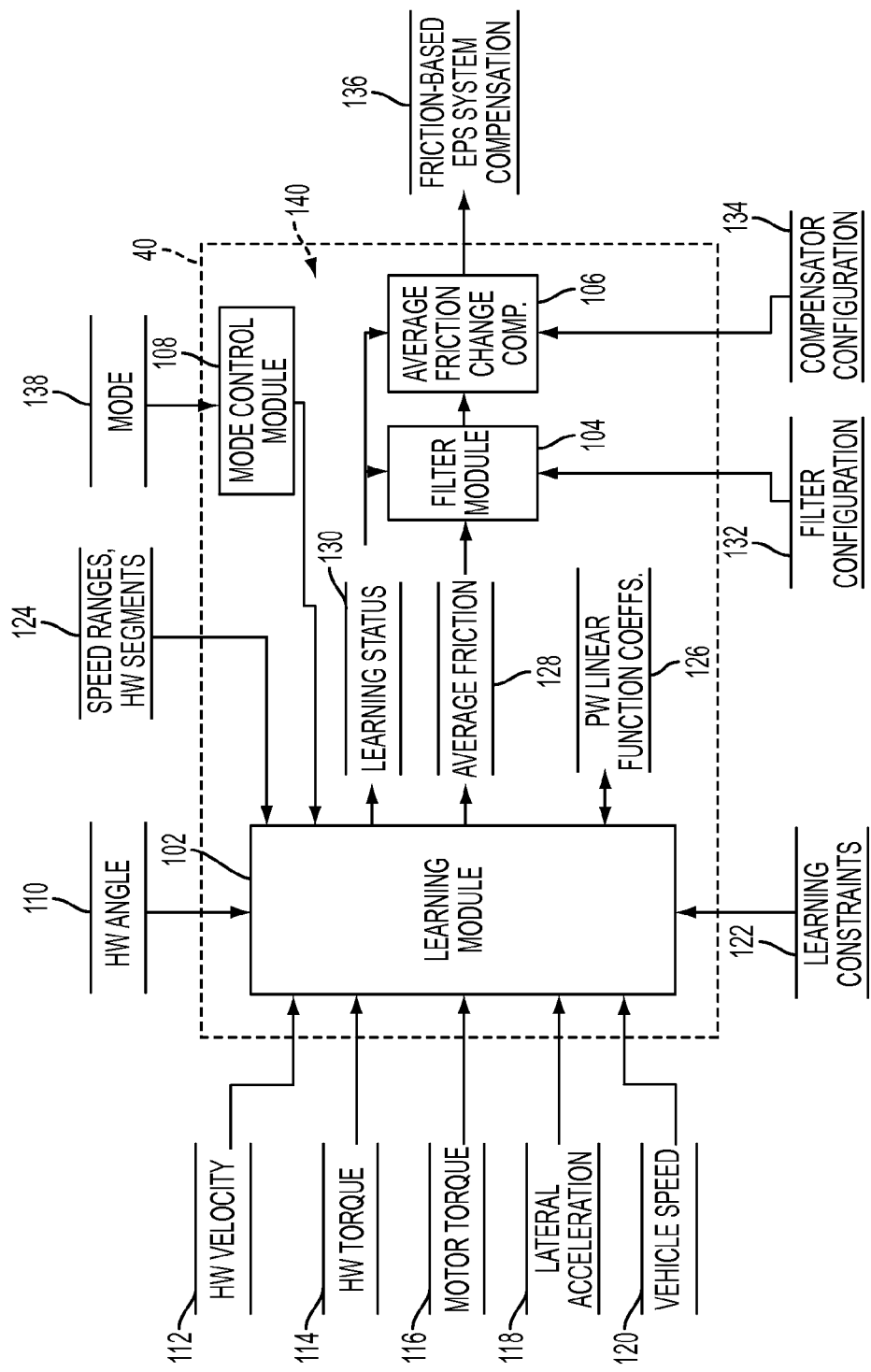
FIG. 2 is a dataflow diagram illustrating a control module in accordance with exemplary embodiments.

FIG. 2 depicts a dataflow diagram further illustrating the control module 40 of FIG. 1 in accordance with exemplary embodiments. In various embodiments, the control module 40 can include one or more sub-modules and data stores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate friction-based EPS system compensation for the steering system 12 of FIG. 1. Inputs to the control module 40 can be generated from the sensors 31, 32, 33 of FIG. 1 of the vehicle 10 of FIG. 1, can be received from other control modules (not shown) within the vehicle 10, can be modeled, and/or can be predefined. For example, a total column torque can be calculated based on a hand wheel torque from sensor 31 plus an assistance torque determined by the control module 40.

The control module 40 includes a learning module 102, a filter module 104, an average friction change compensator 106, and a mode control module 108. The learning module 102 receives a hand wheel angle 110, a hand wheel velocity 112, a hand wheel torque 114, a motor torque 116, lateral acceleration 118, vehicle speed 120, learning constraints 122, and speed ranges and hand wheel segments 124. The speed ranges and hand wheel segments 124 define a plurality of vehicle speed intervals and hand wheel angle segments across a broader vehicle speed range and hand wheel angle range of interest. The learning module 102 includes a learning function that generates and updates piecewise linear function coefficients 126. The learning module 102 also generates an average friction 128 and learning status 130. The filter module 104 operates on the average friction 128 and learning status 130 according to filter configuration 132. The average friction change compensator 106 receives filtered input from the filter module 104 and updates a friction-based EPS system compensation 136 based on the learning status 130 and compensator configuration 134.

Based on mode 138, the mode control module 108 can modify operation of the learning module 102, filter module 104, and average friction change compensator 106, which are collectively referred to as friction compensation system 140. The friction compensation system 140 can support fast and slow learning of fast and slow frictions as further described herein. In exemplary embodiments, there are three defined working values for the mode 138 to control the friction compensation system 140: calibration mode, running mode, and resetting mode. In calibration mode, baseline (normal) friction is learned and saved in memory (e.g., EPROM, flash, etc.), and compensation is forced to zero. In running mode, the current friction is compared with the baseline friction, and compensation is made accordingly. In resetting mode, the friction compensation system 140 is reset to an initial state.

The baseline friction may be learned after other EPS system calibration variables have been calibrated, in particular the calibration variables related to EPS system friction level such as a hysteresis compensation table, and the desired steering feel has been obtained. The following steps can be followed to obtain the baseline friction:

1. Set the mode 138 to resetting mode to initialize the friction compensation system 140 to an initial state.

2. Set the mode 138 to calibration mode.
3. Drive the vehicle 10 of FIG. 1 at all desired vehicle speed intervals, and observe fast and slow friction for each vehicle speed interval until the fast and slow friction are stable. Fast and slow learning can be tuned during this step for a desired learning rate.
4. Set the mode 138 to running mode.

Assuming that all other EPS system calibrations give correct steering feel for the learned baseline friction, the learned baseline friction can be used for the same kind of gear and vehicle, and the average friction change of a particular gear compared to the baseline gear can be detected and compensated, to make the overall steering feel similar to the baseline steering feel, even with gear friction differences.

Figure 3:
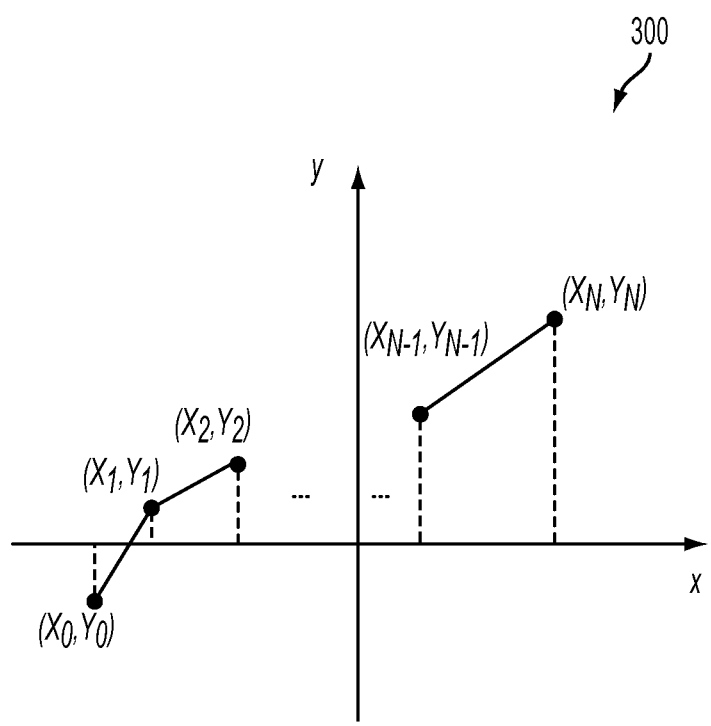
FIG. 3 illustrates an example of a piecewise linear function.

In exemplary embodiments, learning by the learning module 102 is performed based on one or more piecewise linear functions. In a Cartesian coordinate system, for a given non-repeated set of points $(X_i, Y_i)$ where $i=0, 1, \ldots, N$ and $X_0 < X_1 < \ldots < X_N$, a piecewise linear function 300 can be formed by connecting these points consecutively as shown in FIG. 3. The ith linear segment is defined by $$y_i(x) = \left(\frac{Y_i - Y_{i-1}}{X_i - X_{i-1}}(x - X_{i-1}) + Y_{i-1}\right) g_{X_{i-1}}^{X_i}(x)$$

where $$g_{X_{i-1}}^{X_i}(x) = \begin{cases} 1 & X_{i-1} \leq x < X_i \\ 0 & \text{otherwise} \end{cases},$$

$x \in [X_{i-1}, X_i)$, and $i = 1, \ldots, N$.

Collectively, a piecewise linear function $y_{pl}(x)$ can be written as $$y_{pl}(x) = \sum_{i=1}^{N} y_i(x)$$

$$= \sum_{i=1}^{N} \left(\frac{Y_i - Y_{i-1}}{X_i - X_{i-1}}(x - X_{i-1}) + Y_{i-1}\right) g_{X_{i-1}}^{X_i}(x)$$

$$= \theta^T \varphi$$

where
$\theta^T = [Y_0, Y_1, \ldots, Y_N]$
and $$\varphi = \begin{bmatrix} \frac{X_1 - x}{X_1 - X_0} g_{X_0}^{X_1}(x) \\ \frac{X_2 - x}{X_2 - X_1} g_{X_1}^{X_2}(x) + \frac{x - X_0}{X_1 - X_0} g_{X_0}^{X_1}(x) \\ \vdots \\ \frac{X_N - x}{X_N - X_{N-1}} g_{X_{N-1}}^{X_N}(x) + \frac{x - X_{N-2}}{X_{N-1} - X_{N-2}} g_{X_{N-2}}^{X_{N-1}}(x) \\ \frac{x - X_{N-1}}{X_N - X_{N-1}} g_{X_{N-1}}^{X_N}(x) \end{bmatrix}$$

The piecewise linear function $y_{pl}(x)$ can be written as a weighted linear combination of a set of functions given in $\varphi$. The weight of each element in $\varphi$ is the y coordinate of the corresponding node point.

Figure 4:
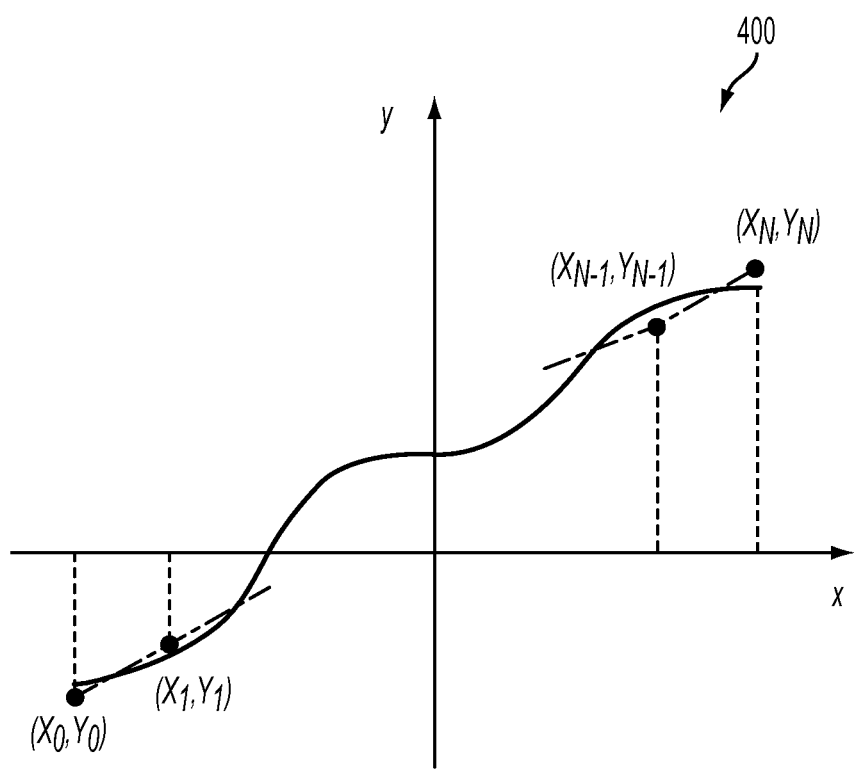
FIG. 4 illustrates an example of an arbitrary curve and an approximation using the piecewise linear function of FIG. 3.

An arbitrary curve 400 on the interval $[X_s, X_e]$ can be approximated using the piecewise linear function formulated above as depicted in FIG. 4. First the interval $[X_s, X_e]$ is divided into N smaller intervals by $X_0, X_1, \ldots, X_N$ where $X_0 < X_1 < \ldots < X_N$ and $X_0 = X_s$ and $X_N = X_e$, and then the y coordinate of each node points is determined for the smallest approximation error with processes as described herein.

Finding weights, i.e. $\theta$, can be solved as an optimization problem. For a set of measured data points $(x_i, y_i)$ where $i=1, \ldots, M$, the corresponding set $(\phi_i, y_i)$ of the same size can be derived immediately. With the estimated parameter $\hat{\theta} = [\hat{Y}_0, \hat{Y}_1, \ldots, \hat{Y}_N]^T$, a piecewise linear function can be written as $\hat{y}(x) = \phi^T \hat{\theta}$, where $\hat{y}(x)$ is the estimated output.

Finding the estimated parameter $\hat{\theta} = [\hat{Y}_0, \hat{Y}_1, \ldots, \hat{Y}_N]^T$ can be solved as an optimization problem such that the resulting estimated parameter gives the minimal estimation error for a given sample set in terms of a chosen criterion. Though different optimization criteria exist, among them, the most commonly used is mean square error given as:

$$V_M(A) = \frac{1}{M} \sum_{t=1}^{M} (\hat{y}(t \mid \theta) - y(t))^2,$$

where M is the number of sample points. The optimization can be formulated as finding the parameters vector $\hat{\theta}$ to minimize the mean squared error as:

$$\hat{\theta} = \arg\min_{\theta} V_m(\theta).$$

Parameter optimization can be solved using multiple algorithms. In a real-time application, optimization algorithms may include a recursive least square algorithm (RLS) and a least mean square algorithm (LMS), which are recursive and can be implemented in a real-time system.

Following the recursive least square algorithm (RLS) approach, the recursive least square algorithm is given as:

$$\hat{\theta}(k) = \hat{\theta}(k-1) + \mu \frac{P(k-1)\varphi(k)}{\alpha + \varphi^T(k)P(k-1)\varphi(k)} \left(y(k) - \varphi^T(k)\hat{\theta}(k-1)\right)$$

$$P(k) = \frac{1}{\alpha}\left[P(k-1) - \frac{P(k-1)\varphi(k)\varphi^T(k)P(k-1)}{\alpha + \varphi^T(k)P(k-1)\varphi(k)}\right],$$

where $k=1, 2, \ldots$ w/initial conditions such that
$\hat{\theta}(0)$: an arbitary N+1 column vector
$P(0)$: a (N+1)×(N+1) positive definite matrix
$\alpha \in (0,1]$: forgetting factor
$\mu \in (0,1]$: learning rate gain The forgetting factor $\alpha$ and the learning rate gain $\mu$ can be used to tune the learning rate. A larger $\alpha$ value corresponds to a slower learning rate, which is proper for a slow changing process, while a smaller $\alpha$ value corresponds to a fast learning rate, which can track a fast changing process but is more sensitive to input measurement noise. A larger learning rate gain $\mu$ results in a faster learning. These two control parameters can be tuned for the target application.

When $\alpha$ is less than 1, the covariance matrix P will increase exponentially, and has a "blow up" problem. When $\alpha$ equals to 1, the covariance matrix P will get smaller after some iteration, and make the gain dramatically smaller. In this case $\hat{\theta}(k)$ may stop varying. For both cases, the issue can be solved by resetting the covariance matrix P after about 10-20 iterations. Though the initial values of $\hat{\theta}$ and P can be any N+1 column vector and (N+1)×(N+1) positive definite matrix, they are normally initialized as a N+1 zero vector, and an (N+1)×(N+1) identity matrix, i.e., $$\hat{\theta}(0) = \begin{bmatrix} 0 \\ \vdots \\ 0 \end{bmatrix}_{(N+1)\times 1} \text{ and } P(0) = \begin{bmatrix} 1 & \cdots & 0 & 0 \\ \vdots & \ddots & 0 & 0 \\ 0 & 0 & 1 & 0 \\ 0 & 0 & 0 & 1 \end{bmatrix}_{(N-1)\times(N+1)}$$

In this particular application to the estimation of the piecewise linear function coefficients, the calculation of RLS procedure can be optimized considering that in the vector $\phi$ only two elements are nonzero at maximum for a given x, e.g., for $x \in [X_{i-1}, X_i]$, only i-th and (i+1)-th elements of $\phi$ are possibly nonzero, and all other elements are always zeros. This property can be used to reduce the load of the calculation which involves $\phi$.

Alternatively, the least mean square (LMS) algorithm can be applied in the estimation of the piecewise linear function coefficients. The parameter $\hat{\theta}$ can be recursively found by:

$$\hat{\theta}(k) = \hat{\theta}(k-1) + \eta(y(k) - \phi^T(k)\hat{\theta}(k-1))\phi(k).$$

$\hat{\theta}(0)$: an arbitary N+1 column vector
$\eta$: a learning gain

In the approach, the learning gain $\eta$ is the only tuning parameter to control the convergence rate of learning. If $\eta$ is chosen as a very small value, the learning convergence rate is very slow. A larger value of $\eta$ leads to a faster learning convergence rate but it becomes less stable. The largest value of $\eta$ is limited by the inverse of the largest eigenvalue $\lambda_{max}$ of the correlation matrix R where $R(k) = \phi(k)\phi^T(k)$. The system becomes unstable if $\eta$ is greater than or equal to $2/\lambda_{max}$. Compared with the RLS algorithm, the LMS algorithm is simpler and more efficient in terms of calculation, and also takes less computer memory in the real-time implementation, but in general, it converges slower than the RLS algorithm.

Due to the system overall friction in the EPS system, a hysteresis loop can be observed from a plot of the total column torque versus the hand wheel angle or a plot of the total column torque versus the vehicle lateral acceleration, and the system total friction can be approximated as a half of the hysteresis magnitude from hysteresis loops. The system friction can be derived from modeling the hysteresis loop of total column torque versus hand wheel angle. The process, as described in greater detail herein, can be readily applied to model the hysteresis of the total column torque versus the lateral acceleration as well as any other hysteresis loops.

In exemplary embodiments, since at different vehicle speeds the hysteresis of the total column torque versus the hand wheel angle exhibits different shapes and sizes, it is necessary to divide the interested vehicle speed range into $N_{spd}$ smaller vehicle speed intervals (also referred to as vehicle speed ranges) such that in each vehicle speed interval, the hysteresis loop is more consistent.

Figure 5:
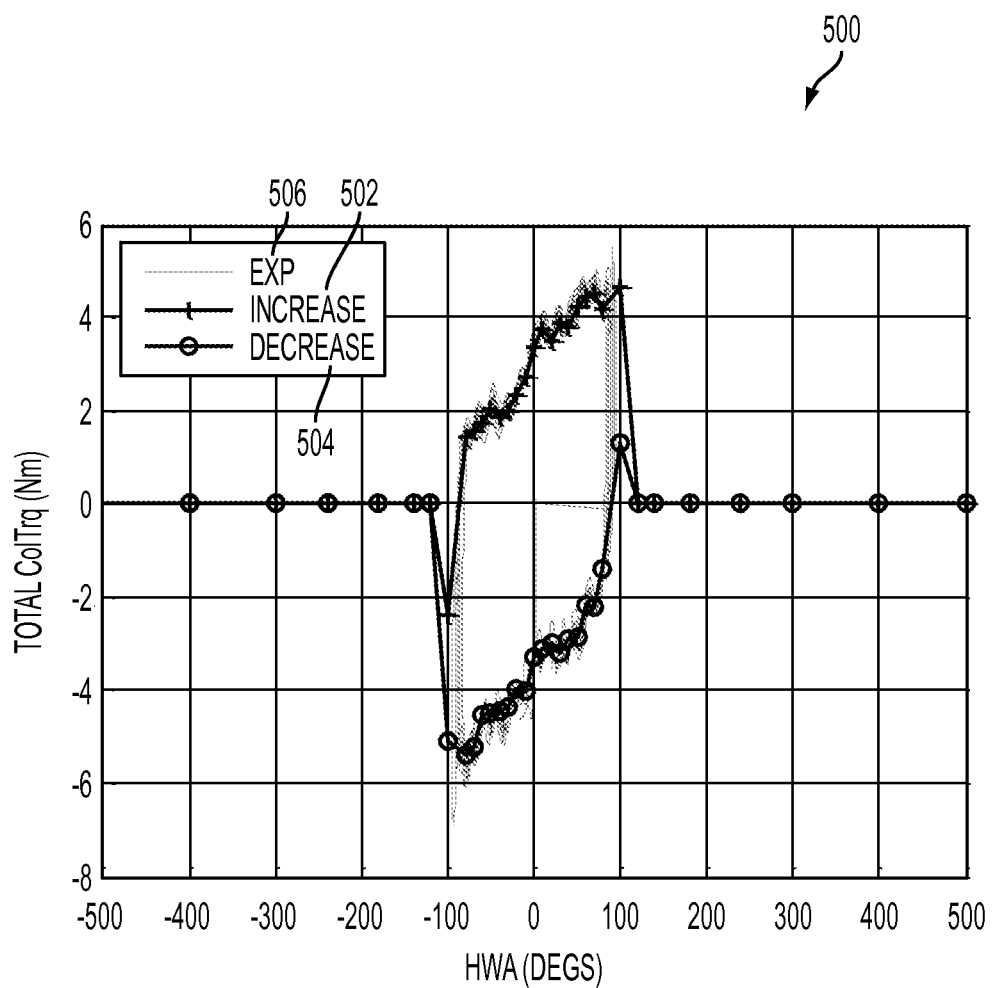
FIG. 5 illustrates an example of a plot of total column torque versus hand wheel angle in an electric power-assisted steering system for a sample test and a learning result.

For a hysteresis loop corresponding to the k-th vehicle speed interval, increasing and decreasing portions of the hysteresis loop can be approximated using two piecewise linear functions, parameterized by $\theta_{VehSpd,k}^{Inc}$ and $\theta_{VehSpd,k}^{Dec}$, respectively, with the application of the piecewise linear function and learning algorithms previously described, the coefficients $\theta_{VehSpd,k}^{Inc}$ and $\theta_{VehSpd,k}^{Dec}$ of these two piecewise linear functions can be obtained via learning based on the measured hand wheel angle and total column torque. FIG. 5 illustrates an example with the learning results for increasing 502 and decreasing 504 piecewise linear functions and expected results 506 for total column torque versus the hand wheel angle.

In order to minimize the variances caused by some unknown or uncontrolled factors, multiple constraints are adopted such that the recursive learning only happens when all of these constraints are satisfied in exemplary embodiments.

Figure 6:
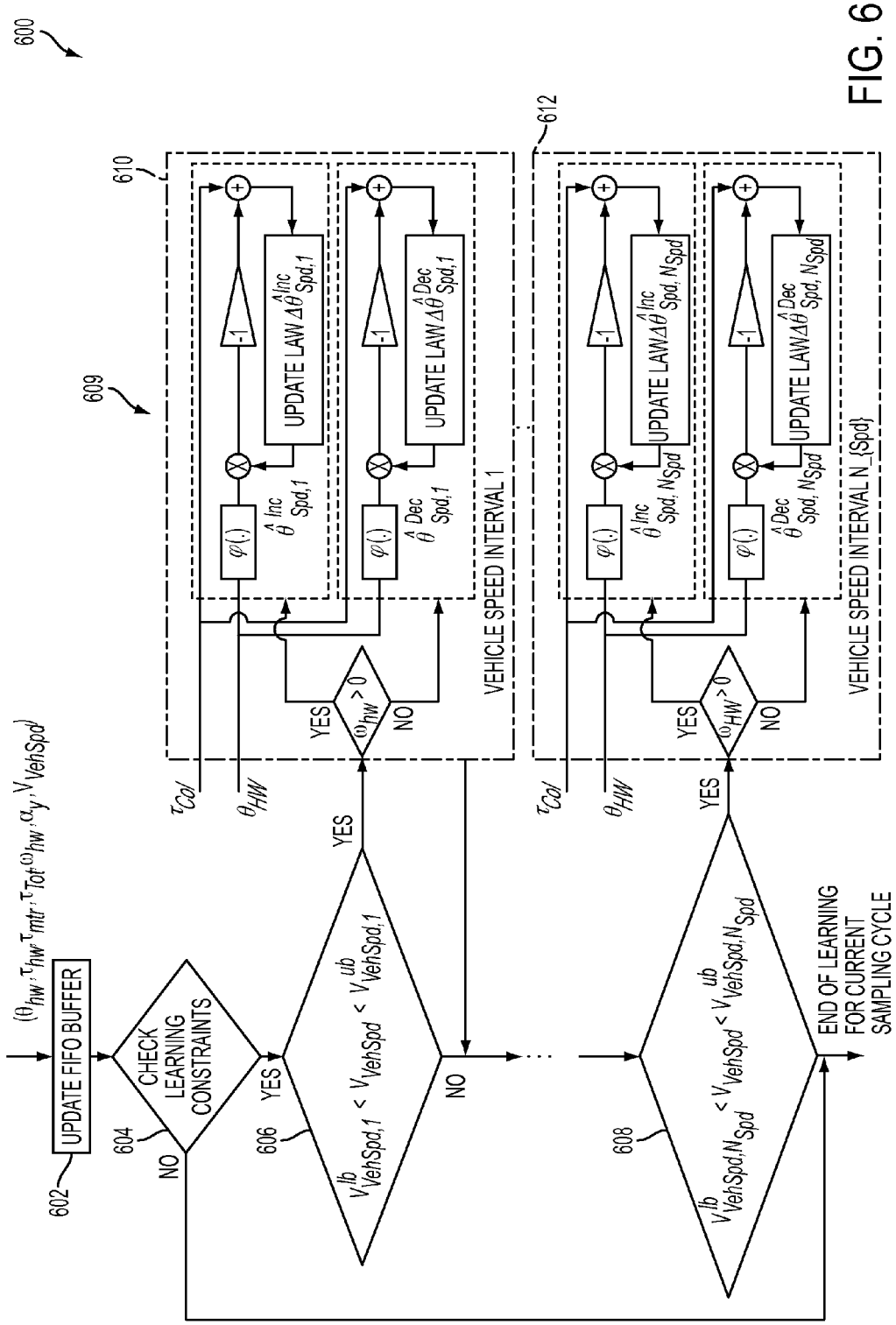
FIG. 6 illustrates an example of a learning function in accordance with an embodiment of the invention.

The example flow diagram in FIG. 6 depicts a learning function 600 in the overall process that can be implemented by the learning module 102 of FIG. 2. To limit the impact of measurement noise, a FIFO buffer 602 of the depth N is used to buffer input measurements (hand wheel angle ($\theta_{hw}$), hand wheel velocity ($\omega_{hw}$), hand wheel torque ($\tau_{hw}$), motor torque ($\tau_{mtr}$), total column torque ($\tau_{Tot}$), lateral acceleration ($a_y$), vehicle speed ($v_{VehSpd}$)), the elements in the FIFO buffer 602 with index 0 are the latest measurement inputs, and the oldest elements are the (N−1)-th elements. Learning constraints can be checked at block 604 by comparing statistics of the buffered inputs against defined constraint values as follows:

Hand wheel movement monotonically increasing constraint:
$\omega_{hw}(i) \geq 0$ where $i = 0, \ldots, N-1$.
Hand wheel movement monotonically decreasing constraint:
$\omega_{hw}(i) \leq 0$ where $i = 0, \ldots, N-1$.
Hand wheel velocity constancy constraints:
$\max(\omega_{hw}(.)) - \min(\omega_{hw}(.)) \Delta\omega_{hw}$, where $i = 0, \ldots, N-1$.
Hand wheel position constraints: $\theta_{hw,min} \leq \theta_{hw} \theta_{hw,max}$
Hand wheel velocity constraints:

$$\omega_{hw,min} \leq \frac{1}{N}\left|\sum_{i=0}^{N-1}\omega_{hw}(i)\right| \leq \omega_{hw,max}$$

Lateral acceleration constraints: $a_{y,min} \leq a_y \leq a_{y,max}$
The interested vehicle speed range is divided into $N_{spd}$ vehicle speed intervals defined as $(v_{VehSpd,i}^{lb}, v_{VehSpd,i}^{ub})$ where $i = 1, \ldots, N_{spd}$. The interested hand wheel angle range is segmented into N segments by (N+1) points, i.e. $\theta_0^{hw}, \theta_1^{hw}, \ldots, \theta_N^{hw}$ on a hand wheel angle axis. Vehicle speed intervals and hand wheel angle segments can be configured according to the speed ranges and hand wheel segments 124 of FIG. 2. For each hand wheel angle segment, a counter defined to record the number of occurrences of learning while the hand wheel angle is in the hand wheel angle range, and such counters are used in a weighted average friction calculation as further described herein. The overall learning process of the hysteresis of the total column torque vs. the hand wheel angle for different vehicle speed interval is given in FIG. 6.

At the beginning of each sampling cycle, all relevant inputs are acquired, and inputted into the FIFO buffer 602. All learning conditions are checked by examining the buffer data. When all conditions are satisfied, the middle elements in the FIFO buffer 602 for the vehicle speed $v_{VehSpd}$, the hand wheel angle $\theta_{hw}$, and the total column torque $\tau_{Tot}$ are selected for the following learning procedure. The vehicle speed $v_{VehSpd}$ is first compared with vehicle speed interval lower and upper boundaries to identify which vehicle speed interval should be used at blocks 606-608. Then based on the hand wheel velocity direction or hand wheel angle monotonicity, it can be determined whether the learning should occur for the hand wheel angle increasing direction or hand wheel angle decreasing direction of the hysteresis loop. At the end, the learning process as previously described is applied, and the piecewise linear function coefficients $\theta_{VehSpd,k}^{Inc}$ or $\theta_{VehSpd,k}^{Dec}$ are updated based on the estimation errors.

The average friction of each vehicle speed interval is taken as half of the corresponding hysteresis loop size. Here, a weighted-average approach is used to calculate the average friction from the learned hysteresis loop. For the k-th vehicle speed, the increasing and decreasing portions of the hysteresis loop are approximated by two piecewise linear functions with the coefficient set by $\theta_{VehSpd,k}^{Inc}$ and $\theta_{VehSpd,k}^{Dec}$, respectively. The weighted average friction is given by the equation below.

$$f_{avg}^{Spd,k} = \frac{\sum_{i=0}^{N-1}(N_{VehSpd,k}^{Inc,i} + N_{VehSpd,k}^{Dec,i})\begin{pmatrix}\theta_{VehSpd,k}^{Inc}(i) - \theta_{VehSpd,k}^{Dec}(i) + \\ \theta_{VehSpd,k}^{Inc}(i+1) - \theta_{VehSpd,k}^{Dec}(i+1)\end{pmatrix}}{4\sum_{i=0}^{N-1}(N_{VehSpd,k}^{Inc,i} + N_{VehSpd,k}^{Dec,i})},$$

where $N_{VehSpd,k}^{Inc,i}$ and $N_{VehSpd,k}^{Dec,i}$ are the counters in the increasing and decreasing directions of the i-th hand wheel segment of the k-th vehicle speed interval, respectively. The average friction for all $N_{Spd}$ vehicle speeds can be put in vector form as: $[f_{avg}^{Spd,1} \; f_{avg}^{Spd,2} \ldots f_{avg}^{Spd,N_{Spd}}]^T$.

The average frictions $[f_{avg}^{Spd,1} \; f_{avg}^{Spd,2} \ldots f_{avg}^{Spd,N_{Spd}}]^T$ calculated directly from a model of the hysteresis loop 609 formed from blocks 610-612 are passed to two sets of low pass filters with two different bandwidths in the filter module 104 of FIG. 2 as average friction 128. The frictions that are filtered with higher bandwidth filters vary faster, and are referred as fast frictions. The frictions that are filtered with lower bandwidth filters vary relatively slower, and are referred as slow frictions. In the FIG. 7, filter blocks 702 and 704 are high and low bandwidth filters for fast friction and slow friction respectively. Signal input 706 is the calculated friction or average friction 128: $[f_{avg}^{Spd,1} \; f_{avg}^{Spd,2} \ldots f_{avg}^{Spd,N_{Spd}}]^T$. The learning status 130 of FIG. 2 is a vector signal of $N_{Spd}$ elements, where each element corresponds to one vehicle speed range, and its value can be 1 or 0 to indicate if learning is active in that vehicle speed range, respectively based on blocks 604-608 of FIG. 6. The learning status 130 can selectively enable the filters 702 and 704 for different vehicle speed ranges or intervals.

The fast friction filter 702 can receive numerator coefficients 708 and denominator coefficients 710 from the filter configuration 132 of FIG. 2 to establish bandwidth, roll-off, and ripple characteristics for the fast friction filter 702. The fast friction filter 702 outputs fast friction 711. Similarly, the slow friction filter 704 can receive numerator coefficients 712 and denominator coefficients 714 from the filter configuration 132 of FIG. 2 to establish bandwidth, roll-off, and ripple characteristics for the slow friction filter 704. The slow friction filter 704 outputs slow friction 715.

For safety reasons, the fast and slow frictions 711 and 715 are limited by brackets which are determined by the ending fast and slow friction of the previous ignition cycle and the allowable friction changes over ignition cycle. As the shown in FIG. 7, the fast and slow frictions 711 and 715 from the filters 702 and 704 are passed to fast and slow friction limit blocks 716 and 718. Each limit block 716 and 718 takes two inputs. For limit block 716, the first input is the current fast friction 711 from the fast friction filter 702, and the second input is a saved fast friction 720 from the end of the previous ignition cycle. The fast friction 711 is limited as a saturated fast friction 721. Similarly, for limit block 718, the first input is the current slow friction 715 from the slow friction filter 704, and the second input is a saved slow friction 722 from the end of the previous ignition cycle. The slow friction 715 is limited as a saturated slow friction 723.

Figure 7:
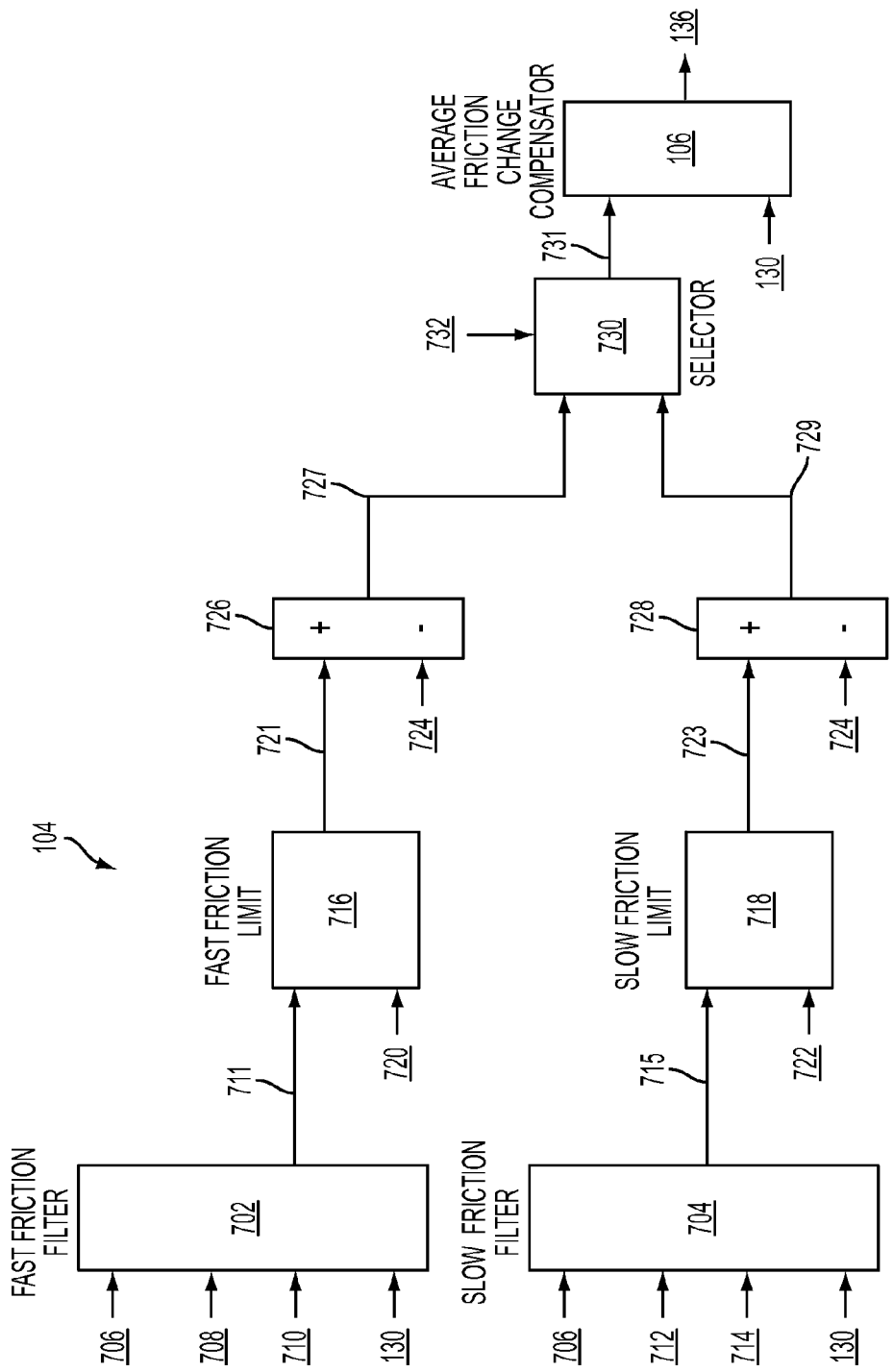
FIG. 7 illustrates an example of friction filtering and an average friction change compensator in accordance with an embodiment of the invention.
Figure 8:
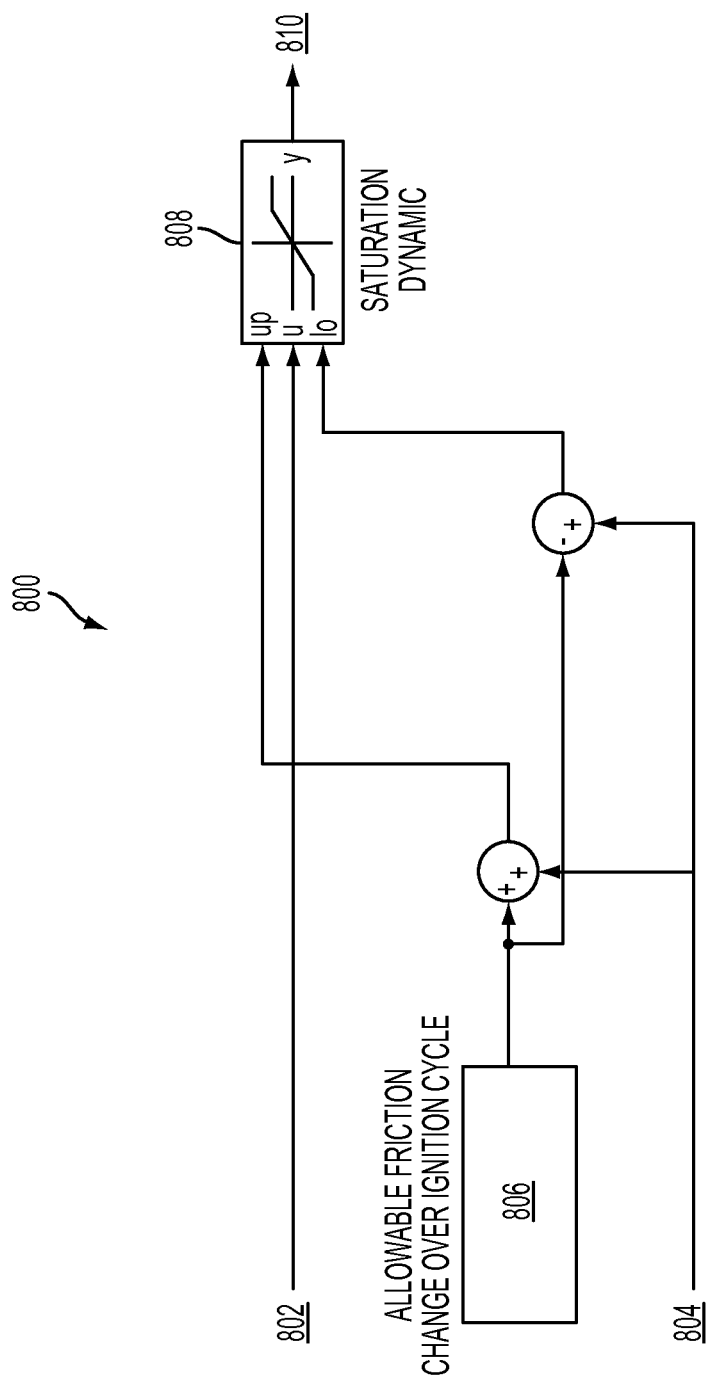
FIG. 8 illustrates an example of a friction change limiter in accordance with an embodiment of the invention.

The details of the limit blocks 716 and 718 of FIG. 7 are depicted in friction change limiter 800 of FIG. 8. A first input 802, such as fast friction 711 or slow friction 715 of FIG. 7, is limited by a second input 804, such as saved fast friction 720 or saved slow friction 722 of FIG. 7 and an allowable friction change over ignition cycle 806 at saturation dynamic block 808. The output of the saturation dynamic block 808 is a saturated output 810, such as saturated fast friction 721 or saturated slow friction 723 of FIG. 7.

Returning to FIG. 7, fast and slow average friction changes are obtained by comparing the saturated fast and slow frictions 721 and 723 with a baseline (norm) calibrated friction 724. Summing junctions 726 and 728 are used to compute fast and slow average friction changes 727 and 729 respectively as the saturated fast and slow frictions 721 and 723 subtracted by the calibrated friction 724. Selector block 730 passes one of the fast and slow average friction changes 727 and 729 as an average friction change 731 to the average friction change compensator 106 based on a selection signal 732 to alternate between inputs. The average friction change compensator 106 also receives the learning status 130 to selectively enable the average friction change compensator 106 for different vehicle speed intervals.

Figure 9:
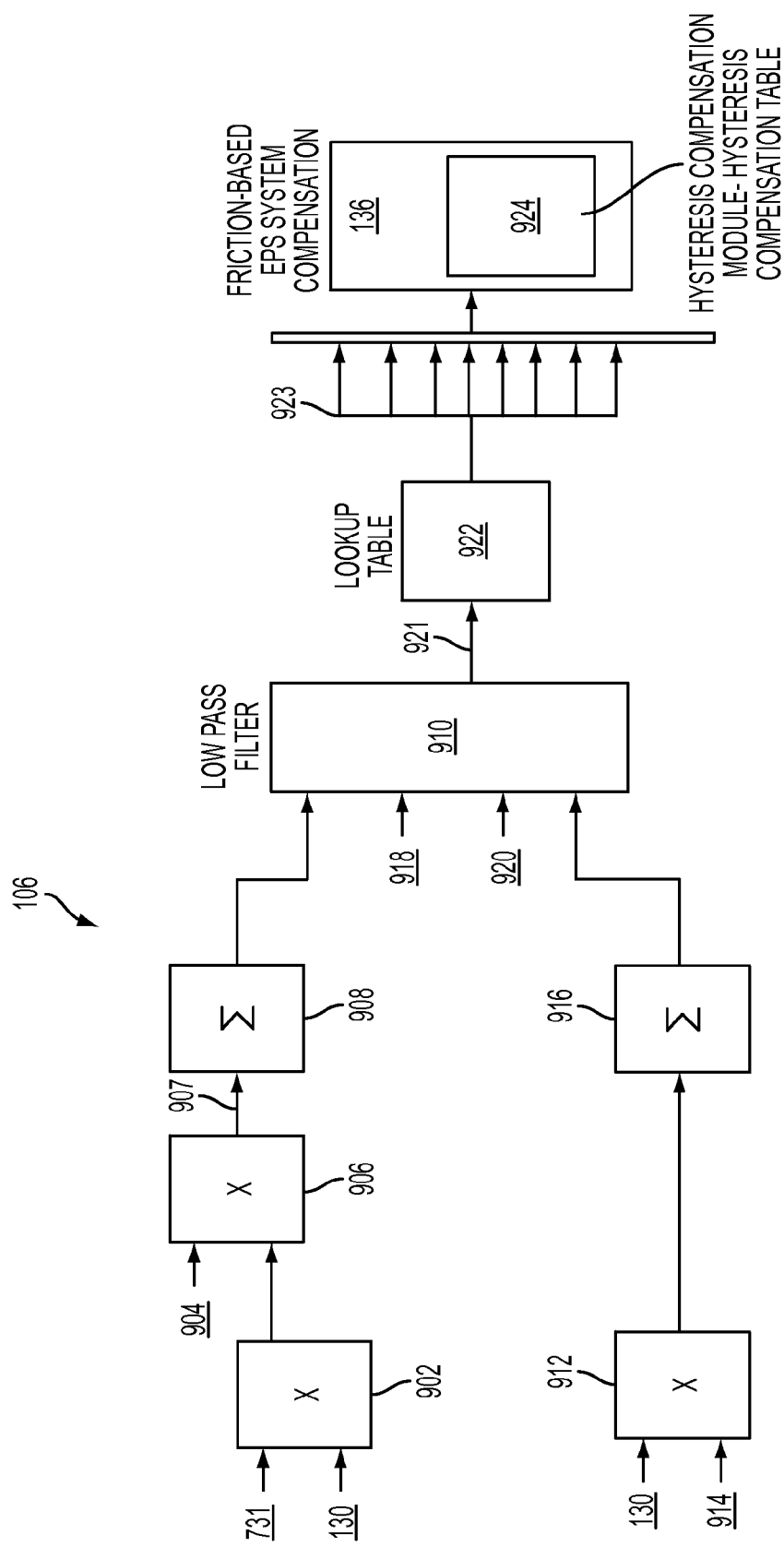
FIG. 9 illustrates an example of details of the average friction change compensator of FIG. 7 in accordance with an embodiment of the invention.

FIG. 9 depicts details of the average friction change compensator 106 according to an embodiment. The average friction change compensator 106 provides a smooth transition of the average friction change 731 when the vehicle speed changes from one vehicle speed interval to another vehicle speed interval. Multiplier 902 computes a product of the average friction change 731 and the learning status 130, which is further multiplied by friction change weights 904 at multiplier 906. The multiplier 906 outputs a weighted average friction change 907 which is summed for all elements at summation block 908 and passed to a low pass filter 910. Multiplier 912 computes a product of the learning status 130 and vehicle speed masks 914, which is summed for all elements at summation block 916 and passed to low pass filter 910. The low pass filter 910 also receives numerator coefficients 918 and denominator coefficients 920 from the compensator configuration 134 of FIG. 2 to establish bandwidth, roll-off, and ripple characteristics. The compensator configuration 134 of FIG. 2 can also define values for the friction change weights 904, vehicle speed masks 914, and lookup table 922.

The output of low pass filter 910 is a single value average friction change 921 for the current vehicle speed. The lookup table 922 is used to tune the compensation level for a given average friction change. In the example system, compensation is added to a hysteresis compensation module—hysteresis compensation table 924 of the friction-based EPS system compensation 136. For integration purposes, an 8-element vector 923 is populated in this example with the output of the lookup table 922, which is the same dimension as the hysteresis compensation module compensation table 924. This vector is added to Y-values of the hysteresis compensation module—hysteresis compensation table 924. In this way, the Y-values of the hysteresis compensation module—hysteresis compensation table 924 are shifted up or down by the amount of compensation provided for the average friction change.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system comprising:
an electric power assisted steering (EPS) system for a vehicle; and a control module that controls a steering actuator motor of the EPS system, the control module comprising a processor that executes:
a learning function configured to determine a plurality of piecewise linear function coefficients based on measured data for the EPS system, the piecewise linear function coefficients determined in real-time while the EPS system is in operation, the measured data comprising a vehicle speed, the learning function further configured to model a hysteresis loop of the EPS system using a piecewise linear function based on the plurality of piecewise linear function coefficients to determine an average friction; and
an average friction change compensator configured to adjust friction-based EPS system compensation based on the average friction, wherein an interested vehicle speed range is divided into a plurality of vehicle speed intervals and the average friction is determined separately for each of the vehicle speed intervals.

2. The system of claim 1, wherein the hysteresis loop is for a total column torque versus a hand wheel angle.

3. The system of claim 1, wherein the plurality of piecewise linear function coefficients are determined based on one of a recursive least square algorithm and a least mean square algorithm.

4. The system of claim 1, wherein a model of the hysteresis loop is formed for the plurality of vehicle speed intervals with an increasing portion and a decreasing portion of the hysteresis loop approximated using piecewise linear functions for each of the plurality of vehicle speed intervals.

5. The system of claim 1, wherein the learning function is further configured to constrain determination of the plurality of piecewise linear function coefficients based on satisfying a plurality of constraints relative to the measured data, and the determination of the plurality of piecewise linear function coefficients is divided into the plurality of vehicle speed intervals and segmented by a plurality of hand wheel angle segments.

6. The system of claim 5, wherein the average friction is a vector of average frictions for each of the plurality of vehicle speed intervals determined as a weighted average for each of the plurality of vehicle speed intervals.

7. The system of claim 1, further comprising:
a fast friction filter configured to apply higher bandwidth filtering to the average friction;
a slow friction filter configured to apply lower bandwidth filtering to the average friction;
a fast friction limiter configured to limit output changes from the fast friction filter; and
a slow friction limiter configured to limit output changes from the slow friction filter.

8. The system of claim 7, wherein the average friction change compensator is further configured to determine a fast average friction change as a difference between an output of the fast friction limiter and a calibrated friction, and to determine a slow average friction change as a difference between an output of the slow friction limiter and the calibrated friction.

9. The system of claim 8, wherein the average friction change compensator is further configured to provide a smooth transition of a selected friction change when the vehicle speed changes from one vehicle speed interval to another vehicle speed interval of the plurality of vehicle speed intervals, wherein the selected friction change is selected as one of the fast average friction change and the slow average friction change.

10. A method comprising:
determining a plurality of piecewise linear function coefficients based on measured data for an electric power-assisted steering (EPS) system for a vehicle by a processor of a control module that controls the EPS system, the measured data comprising a vehicle speed, the piecewise linear function coefficients determined in real-time while the EPS system is in operation;
modeling a hysteresis loop of the EPS system by the processor using two piecewise linear functions based on the plurality of piecewise linear function coefficients to determine an average friction; and
adjusting friction-based EPS system compensation by the processor to control a steering actuator motor of the EPS system based on the average friction, wherein an interested vehicle speed range is divided into a plurality of vehicle speed intervals and the average friction is determined separately for each of the vehicle speed intervals.

11. The method of claim 10, wherein the hysteresis loop is for a total column torque versus a hand wheel angle.

12. The method of claim 10, wherein the plurality of piecewise linear function coefficients are determined based on one of a recursive least square algorithm and a least mean square algorithm.

13. The method of claim 10, further comprising:
forming a model of the hysteresis loop for the plurality of vehicle speed intervals with an increasing portion and a decreasing portion of the hysteresis loop approximated using piecewise linear functions for each of the plurality of vehicle speed intervals.

14. The method of claim 10, further comprising:
constraining determination of the plurality of piecewise linear function coefficients based on satisfying a plurality of constraints relative to the measured data, and wherein the determination of the plurality of piecewise linear function coefficients is divided into the plurality of vehicle speed intervals and segmented by a plurality of hand wheel angle segments.

15. The method of claim 14, wherein the average friction is a vector of average frictions for each of the plurality of vehicle speed intervals determined as a weighted average for each of the plurality of vehicle speed intervals.

16. The method of claim 10, further comprising:
applying higher bandwidth filtering to the average friction using a fast friction filter;
applying lower bandwidth filtering to the average friction using a slow friction filter;
limiting output from the fast friction filter; and
limiting output from the slow friction filter.

17. The method of claim 16, further comprising:
determining a fast average friction change as a difference between the limited output of the fast friction filter and a calibrated friction; and
determining a slow average friction change as a difference between the limited output of the slow friction filter and the calibrated friction.

18. The method of claim 17, further comprising:
providing a smooth transition of a selected friction change when the vehicle speed changes from one vehicle speed interval to another vehicle speed interval of the plurality of vehicle speed intervals, wherein the selected friction change is selected as one of the fast average friction change and the slow average friction change.

19. A method comprising:
initializing a friction compensation system based on a processor of a control module determining that the friction compensation system is in a resetting mode;
learning a baseline friction by the processor of the control module for an electric power-assisted steering (EPS) system for a vehicle based on determining that the friction compensation system is in a calibration mode, the learning of the baseline friction comprising:
receiving a vehicle speed;
monitoring a plurality of vehicle speed intervals of the vehicle speed; and
determining a fast average friction and a slow average friction for each of the plurality of vehicle speed intervals until the fast average friction and the slow average friction are determined to be stable, the fast average friction comprising an average friction filtered with a higher bandwidth filter relative to the slow average friction filtered with a lower bandwidth filter; and
dynamically adjusting friction compensation to account for changes from the learned baseline friction based on determining that the friction compensation system is in a running mode.

* * * * *